United States Patent
Lau

(10) Patent No.: US 9,247,418 B2
(45) Date of Patent: Jan. 26, 2016

(54) COMMUNICATION-SESSION TERMINATION WHEN SUBSCRIBER SERVER IS UNAVAILABLE

(75) Inventor: Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 156 days.

(21) Appl. No.: 13/548,527

(22) Filed: Jul. 13, 2012

(65) Prior Publication Data

US 2014/0018039 A1  Jan. 16, 2014

(51) Int. Cl.
*H04W 4/00* (2009.01)
*H04W 8/20* (2009.01)
*H04L 29/06* (2006.01)

(52) U.S. Cl.
CPC .............. *H04W 8/20* (2013.01); *H04L 65/1016* (2013.01); *H04L 65/1073* (2013.01)

(58) Field of Classification Search
CPC ................ H04L 65/1073; H04L 67/14; H04L 29/12188; H04L 61/1588; H04W 60/00; H04W 8/02; H04W 60/005; H04W 8/04
USPC .............................................. 455/435.1, 411
See application file for complete search history.

(56) References Cited

U.S. PATENT DOCUMENTS

| | | | |
|---|---|---|---|
| 7,899,036 B2 * | 3/2011 | Shen | 370/352 |
| 2007/0113086 A1 * | 5/2007 | Huang et al. | 713/168 |
| 2008/0182575 A1 * | 7/2008 | Torres et al. | 455/435.1 |
| 2008/0227451 A1 * | 9/2008 | Fukui et al. | 455/435.1 |
| 2011/0028130 A1 * | 2/2011 | Swaminathan et al. | 455/414.1 |
| 2011/0149750 A1 * | 6/2011 | Sharma et al. | 370/252 |
| 2011/0185070 A1 * | 7/2011 | Xue et al. | 709/227 |
| 2011/0211527 A1 * | 9/2011 | Agarwal et al. | 370/328 |

* cited by examiner

*Primary Examiner* — Charles Appiah
*Assistant Examiner* — Edward Zhang

(57) ABSTRACT

A method may include receiving, at a serving call session control function (S-CSCF) address database, key information associated with a user device from an S-CSCF. The key information includes a unique identifier associated with the user device, an assigned S-CSCF address serving the user device, and a validity period of session initiation protocol (SIP) registration for the user device with the assigned S-CSCF. The method may further include determining whether a data record based on the key information exists in the S-CSCF address database. Each data record in the S-CSCF address database is searchable based on each unique identifier to provide an S-CSCF address of a serving S-CSCF associated with a corresponding user device.

20 Claims, 11 Drawing Sheets

| UNIQUE ID 504 | S-CSCF ADDRESS 506 | VALIDITY 508 |
|---|---|---|
| 1112224444 | 132.197.76.55 | 12.2.2012.8.15.00 |
| 1112224445 | 132.197.76.56 | 12.2.2012.8.15.00 |
| 1112224446 | 132.197.76.55 | 12.2.2012.8.15.00 |
| 1112224447 | 132.197.76.55 | 12.2.2012.8.15.00 |

502-a (entire row)

FIG. 5

COMMUNICATION-SESSION TERMINATION WHEN SUBSCRIBER SERVER IS UNAVAILABLE

BACKGROUND INFORMATION

A communication session (e.g., a telephone call, a voice over Internet protocol (VoIP) call, a video call, a short message service (SMS), a text message, an instant message, or file transfer, etc.) has an origination and a termination. The connection between them may be set up within a service provider's network or across different networks belonging to the same or different service providers. For example, call origination is the initiation, by a calling party, of a telephone call in a provider network. Call termination is the delivery of an incoming telephone call to the intended called party in either the same network or in another network.

BRIEF DESCRIPTION OF THE DRAWINGS

FIG. 5 is a diagram of an exemplary table of serving call session control function (S-CSCF) address records;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may allow a communication-session setup to a user device by using a default service profile and by retrieving a serving node (e.g., S-CSCF) address information from a serving node address server that includes the serving node address (e.g., an S-CSCF address), in instances in which a home subscriber server that includes the serving node address and subscriber profile for a terminated party is unavailable.

Consistent with embodiments described herein, a determination that a home subscriber server (HSS) is unavailable may be made, and user devices associated with the HSS may be directed to register again by the network. Key information of the registration, including an S-CSCF address, may be stored in the serving node address server. Communication-session termination service for a terminated party may be supported by obtaining the serving node information in the serving node address server and by applying a default service profile when an individual subscriber profile for the terminated party is not available. Although embodiments are described with respect to termination of a communication session using session initiation protocol (SIP), the embodiments are exemplary and not restrictive, and other types of communication sessions using SIP or other protocols are possible to use the same embodiment.

Figure 1:
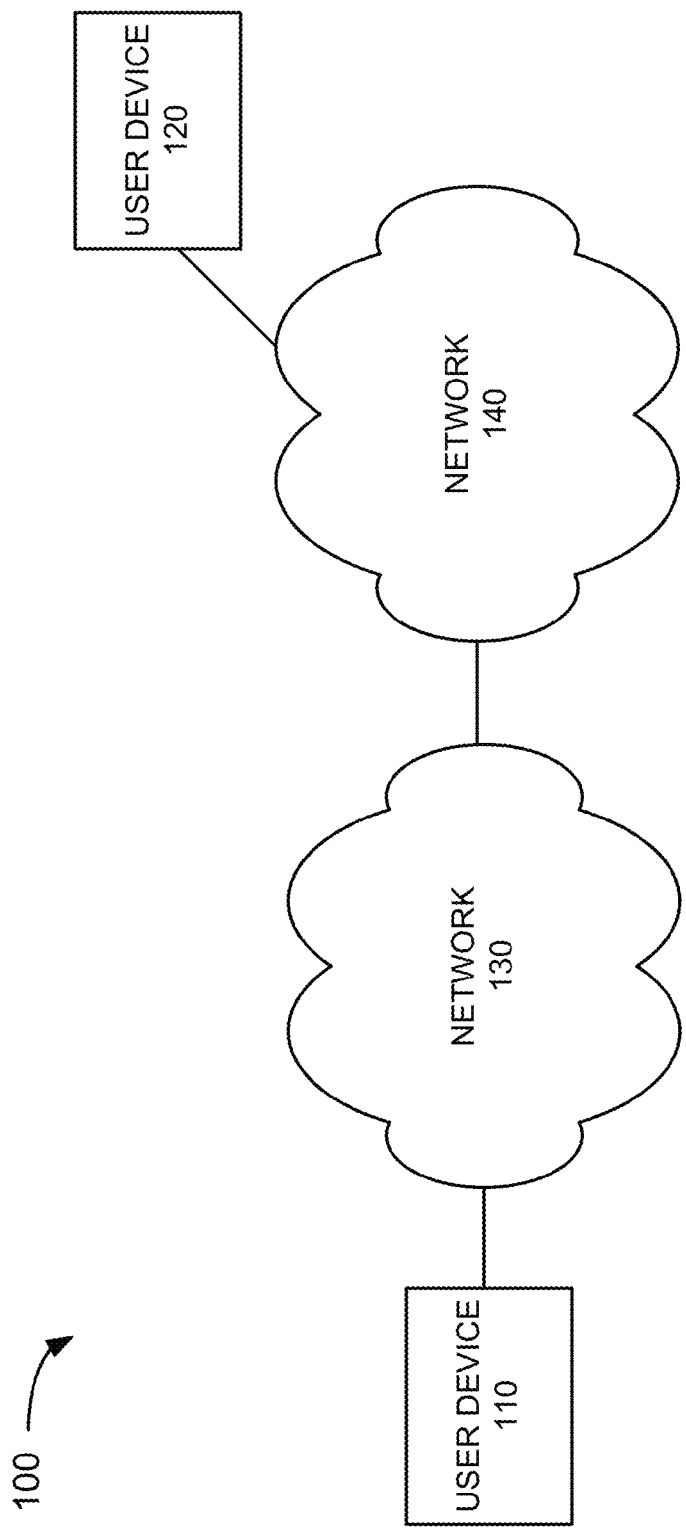
FIG. 1 illustrates an exemplary network in which systems and methods described herein may be implemented.

FIG. 1 is a block diagram of an exemplary network 100 in which systems and methods described herein may be implemented. Network 100 may include originating user devices 110, terminating user devices 120, network 130 and network 140. Network 130 and network 140 may be two different networks or a single network (in an instance in which a communication session is originated and terminated within the same network).

User devices 110 and 120 may each include any type of device that is able to transmit and receive data, such as text data, video data, image data, audio data, multi-media data, etc. For example, user device 110 and user device 120 may include some type of computer, such as a personal computer (PC), a tablet computer, a laptop computer, etc., a personal digital assistant (PDA), a web-based appliance, a mobile terminal (e.g., a cellular telephone), etc. User devices 110 and 120 may also each include a public switched telephone network (PSTN) based telephone, an Internet-protocol (IP) based phone, a wireless telephone, a smart phone, etc., that may be used to make and receive telephone calls.

Networks 130 and 140 may each include one or more wired, wireless and/or optical networks that are capable of receiving and transmitting data, voice and/or video signals, including multi-media signals that may include voice, data and video information. For example, network 130 and network 140 may each include one or more public switched telephone networks (PSTNs) or other type of switched network. Network 130 and/or network 140 may also include one or more wireless networks and may include a number of transmission towers for receiving wireless signals and forwarding the wireless signals toward the intended destinations. Network 130 and/or network 140 may further include one or more satellite networks, one or more packet switched networks, such as an IP-based network, a local area network (LAN), a wide area network (WAN), a personal area network (PAN) (e.g., a wireless PAN), an intranet, the Internet, or another type of network that is capable of transmitting data.

In an exemplary implementation, networks 130 and 140 may each represent a network associated with a service provider that provides various services, such as Internet-protocol (IP) related services, value added services, etc. For example, in one implementation, network 140 may represent an Internet Protocol Multimedia Subsystem (IMS) network that provides services to IMS subscribers (referred to herein as subscribers), and network 130 may represent any network or portion of a network that may not be affiliated with the service provider associated with network 140.

The exemplary configuration illustrated in FIG. 1 is provided for simplicity. It should be understood that a typical network may include more or fewer devices than illustrated in FIG. 1. For example, two user devices 110 and 120 and two networks 130 and 140 are shown for simplicity. It should be understood that network 100 may include a large number (e.g., hundreds or thousands) of user devices and a number of other networks. Network 100 may also include additional elements, such as switches, routers, gateways, backend systems, etc., that aid in routing calls and/or information in network 100 and providing services to parties associated with user devices 110/120.

Figure 2:
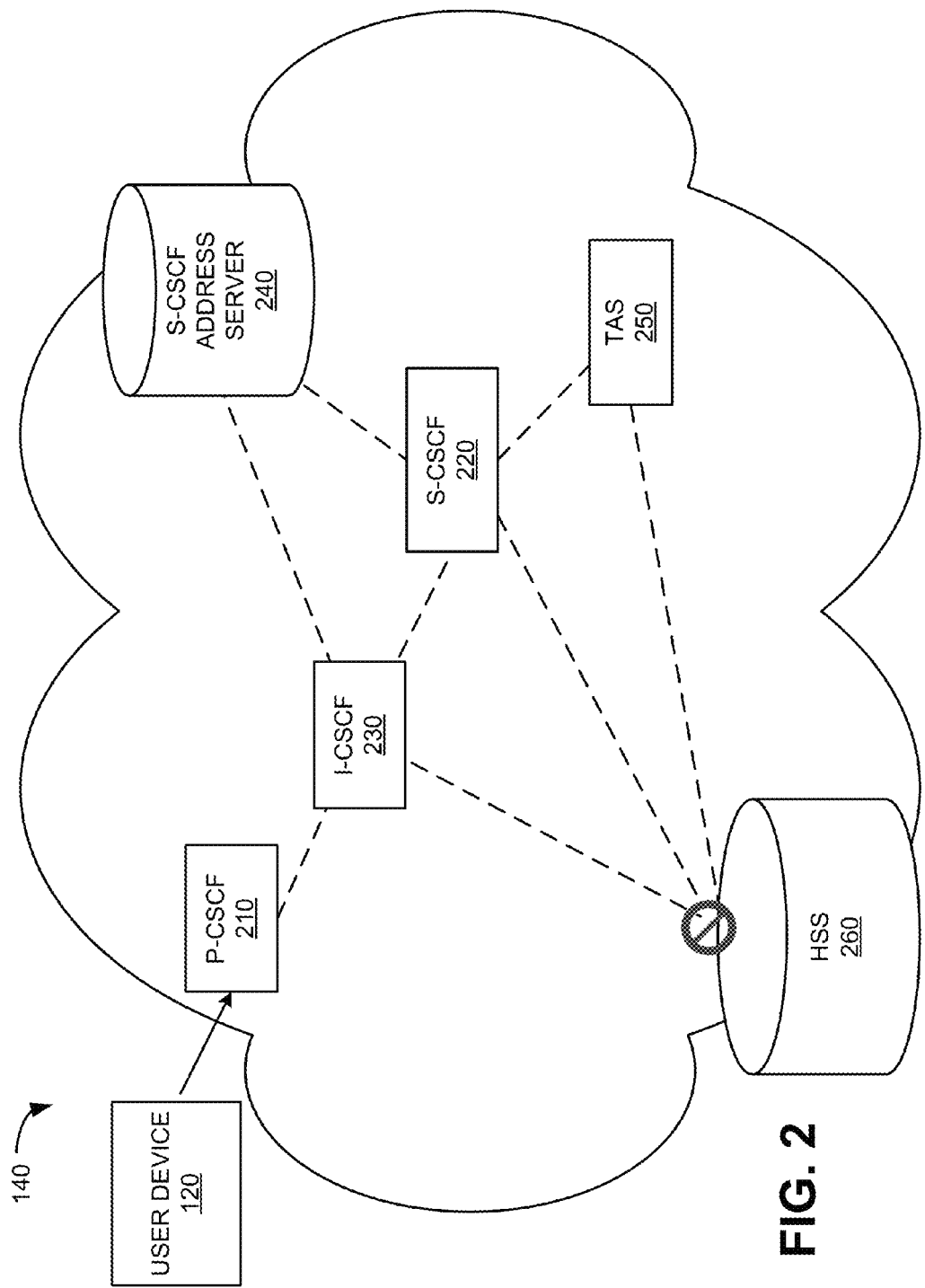
FIG. 2 illustrates exemplary components included in the network of FIG. 1.

FIG. 2 illustrates a portion of network 140 consistent with implementations described herein. As described above, in an exemplary implementation, network 140 may include an IMS network that provides mobile and fixed users with multimedia services. For example, the IMS may provide voice over Internet protocol (VoIP) services for VoIP users, such as a caller at user device 120. Call termination in network 140 may occur when a user device associated with another network or the same network, e.g. user device 110 associated with network 130, originates a call that is to be terminated to user device 120.

Network 140 may include call session control components used to process calls in network 140 (e.g., calls to/from IMS subscribers). For example, network 140 may include proxy call session control function (P-CSCF) 210, serving call session control function (S-CSCF) 220, and interrogating call session control function (I-CSCF) 230. Network 140 may also include an S-CSCF address server 240, a telephone application server (TAS) 250 and a home subscriber server (HSS) 260. It should be understood that network 140 may include additional elements that aid in routing calls and providing services to customers. In addition, functions described as being performed by one of the elements in FIG. 2 may alternatively be performed by another element or multiple elements. In addition, although the various devices illustrated in FIG. 2 are shown as separate devices, in other implementations, the functions performed by two or more of these devices may be performed by a single device or platform. Still further, additional connections (not shown) between the components of FIG. 2 may exist.

P-CSCF 210, S-CSCF 220, and I-CSCF 230 may perform session control processing and may be responsible for parsing a session (e.g., a session initiation protocol (SIP) session) and applying logic (e.g., business logic, service logic, operational logic, etc.) on a per call or per event basis. The outcome of the session control processing may be to route call data to the appropriate components and/or append SIP headers and values to the call data.

In an exemplary implementation, P-CSCF 210, S-CSCF 220 and I-CSCF 230 may be implemented in a single device. Alternatively, P-CSCF 210, S-CSCF 220, and I-CSCF 230 may be implemented using separate network elements/devices. In one implementation, S-CSCF 220 may be viewed as the "brain" (i.e., a central decision making/processing point (or device) in network 140) of the call session control components (i.e., P-CSCF 210, S-CSCFs 220 and 221 and I-CSCF 230). The call session control components may also interact with HSS 260 and/or other elements associated with providing IMS related services.

P-CSCF 210 may act as the main point of contact by network 140 for connections to user devices 120 associated with subscribers of network 140 (referred to herein as subscribers or IMS subscribers). For example, P-CSCF 210 may validate requests from user devices 120, forward the requests to other network nodes (e.g., I-CSCF 230 or S-CSCF 220), request media bearer establishments for a communication sessions for user devices, forward the responses from other network nodes (e.g., I-CSCF 230 or S-CSCF 220) to user devices 120, etc. P-CSCF 210 may also send charging data record to a Charging Collection Function (not shown, a node responsible for billing) for generation of billing records.

S-CSCF 220 may perform session control and registration services for user devices 120 of the IMS network (e.g., network 140). S-CSCF 220 may receive a user service profile, such as initial filter criteria (iFC) document, from another device, such as HSS 260 and route communication session requests from an originating subscriber (e.g., user device 110) to a terminating subscriber (e.g., user device 120). Additionally, S-CSCF 220 may perform user authentication for subscribers. Further, in implementations described herein, S-CSCF 220 may de-register all user devices 120 associated with a particular HSS 260 in response to a determination that HSS 260 is unavailable.

I-CSCF 230 may act as a main point of entry to the IMS network (e.g., network 140) from other networks, such as other IP networks (e.g., network 130). I-CSCF 230 may function to identify the S-CSCF 220 that serves an IMS user. I-CSCF 230 may perform this function for both internally generated calls (e.g., subscriber calls) and for externally generated calls (e.g., non-subscriber calls). For example, an originating S-CSCF 220 in network 130 may receive a subscriber call forwarded via P-CSCF 210, generate a number mapping query, such as an E.164 number mapping (ENUM) query to an ENUM server (not shown), and receive a response identifying a particular I-CSCF 230 associated with the called party's telephone number. S-CSCF 220 may forward the call to the I-CSCF 230 in network 140. If HSS 260 is available, I-CSCF 230 may perform an HSS query and identify, for example, a particular S-CSCF 220 in network 140 that is serving the called party and forward the call to the identified S-CSCF 220.

TAS 250 may perform digit analysis and call processing associated with calls from/to subscribers, such as a subscriber associated with user device 120. TAS 250 may perform "lookup" procedures to the HSS 260 to download subscriber profile of user device 120 and process calls from/to user device 120 based on the subscriber profile. In some implementations, the function of TAS 250 may be integrated with S-CSCF 220 or provided by S-CSCF 220. Furthermore, TAS 250 may not be required to support some communication sessions, such as SMS or RCS (Rich Communication Services) Chat.

HSS 260 may include a user information database that stores mobility information (i.e., serving nodes, location information, etc.), subscription information (i.e., subscriber profile) of user devices, and rules and procedures for processing origination and termination services (e.g. iFC). HSS 260 may contain authentication and authorization information needed to authenticate a user device 120 during registration and maintain registration status of a user device 120. When user device 120 registers with the IMS network without a successful authentication, it is called default registration or registration by default. I-CSCF 230 may query HSS 260 for the location of the user devices 120 by identifying the serving node (e.g., the assigned S-CSCF 220). S-CSCF 220 may download the iFC documents from HSS 260, and TAS 250 may download the subscriber profile from HSS 260. HSS 260 also supports other network elements, such as a mobility management entity (not shown, a key control node responsible for idle mode tracking and paging procedure in a long term evolution (LTE) network), and may provide user information about a network location, registration status, and Internet protocol (IP) address information of the user device 120.

Implementations described herein relate to call termination by obtaining the location of a serving node (e.g., an address of S-CSCF 220) from a network server that includes the address of the serving node and using a default service profile preconfigured in a network in instances in which a subscriber server, such as HSS 260, which includes the location information and subscriber profiles for a called party, fails or is not accessible. As shown herein, when location information of user device 120 and subscriber profile for user device 120 are unavailable, for instance because of a particular network outage associated with HSS 260, S-CSCF address database 230 may provide the location information to I-CSCF 230. S-CSCF 220 and TAS 250 may then use a preconfigured default service profile for call termination services in network 140.

A default service profile, preconfigured by the network operator, may include information indicating services that user devices 120 are allowed to receive in network 140, such as 911 call, two party call, conference calling, call waiting, calling line presentation, SMS, RCS Chat, etc. Default service profiles may be unable to support particular unique features, such as call forwarding to voicemail, etc., which require additional information specific to user accounts (e.g., voice mail system address and voice mail box number). VoIP call with SIP signaling for call setup in an IMS network is used below as an example to illustrate this embodiment.

Figure 3:
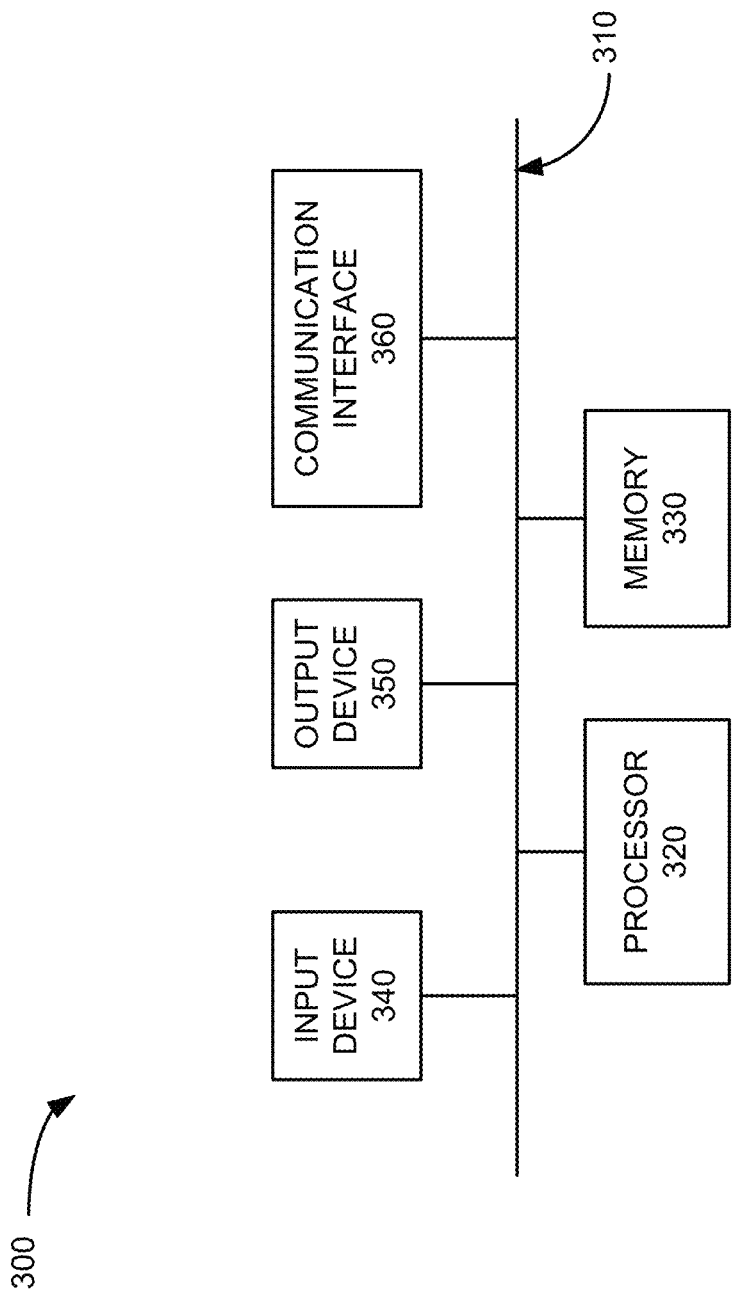
FIG. 3 illustrates an exemplary configuration of one or more of the components of FIG. 2.

FIG. 3 is a diagram of exemplary components of a device 300 that may correspond to user devices 110/120, networks 130/140, P-CSCF 210, S-CSCF 220, I-CSCF 230, S-CSCF address server 240, TAS 250, or HSS 260. Each of user devices 110/120, networks 130/140, P-CSCF 210, S-CSCF 220, I-CSCF 230, S-CSCF address server 240, TAS 250, and HSS 260 may include one or more devices 300. As shown in FIG. 3, device 300 may include a bus 310, a processor 320, a memory 330, an input device 340, an output device 350, and a communication interface 360.

Bus 310 may permit communication among the components of device 300. Processor 320 may include one or more processors or microprocessors that interpret and execute instructions. In other implementations, processor 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processor 320, a read only memory (ROM) or another type of static storage device that stores static information and instructions for the processor 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 100.

As described herein, device 300 may perform certain operations in response to processor 320 executing machine-readable instructions contained in a computer-readable medium, such as memory 330. A computer-readable medium may include a non-transitory memory device. A memory device may include space within a single physical memory device or spread across multiple physical memory devices. The machine-readable instructions may be read into memory 330 from another computer-readable medium or from another device via communication interface 360. The machine-readable instructions contained in memory 330 may cause processor 320 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Figure 4:
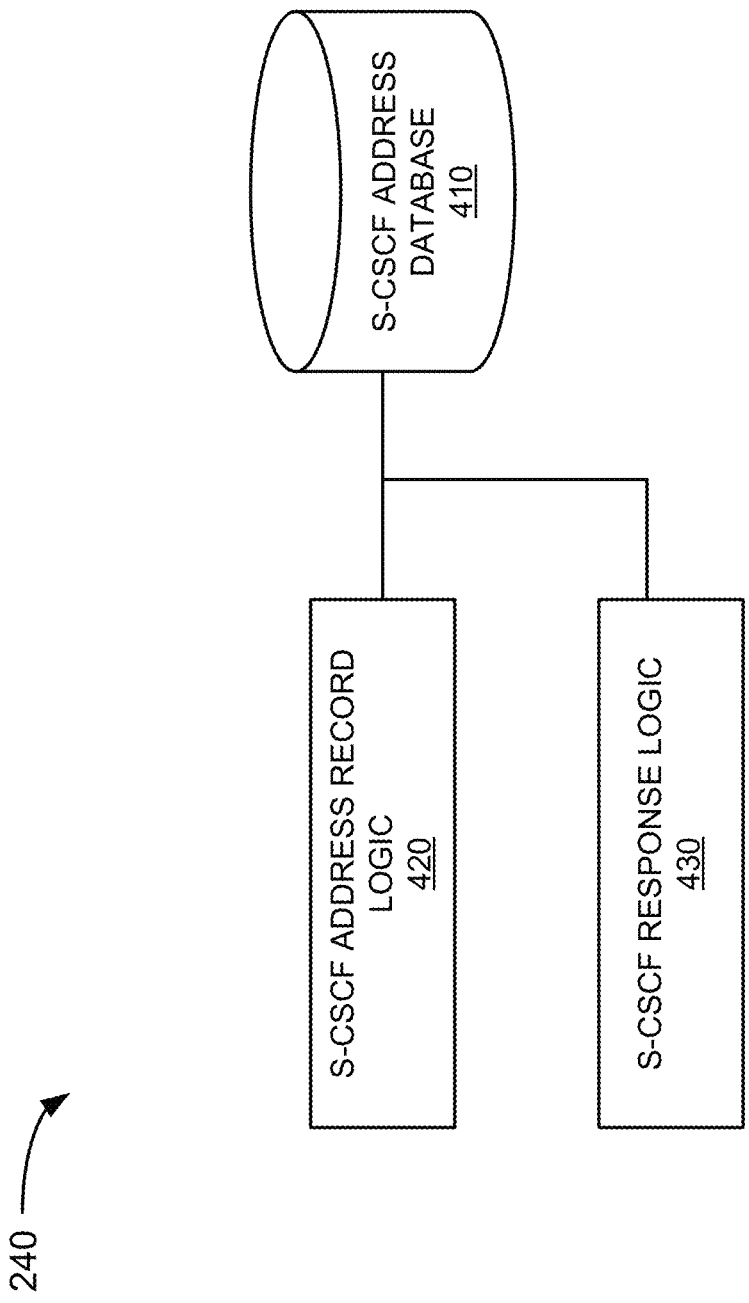
FIG. 4 illustrates an exemplary configuration of one or more of the components of FIG. 2.

FIG. 4 is an exemplary functional block diagram of S-CSCF address server 240 according to an exemplary implementation. The logical blocks illustrated in FIG. 4 may be implemented in machine-readable instructions, hardware, or a combination of hardware and machine-readable instructions. For example, in one implementation, all or some of the logical blocks illustrated in FIG. 4 may be implemented by processor 320 (FIG. 3) executing machine-readable instructions stored in, for example, memory 330. Functions associated with S-CSCF address server 240 are described with respect to FIG. 5 and S-CSCF address table 500.

S-CSCF address server 240 may provide location information (e.g., serving node address or S-CSCF identifier) of user devices 120 in instances in which call termination using HSS 260 is not available, for instance as described with respect to FIG. 8 below. S-CSCF address server 240 may include S-CSCF address database 410, S-CSCF address record logic 420 and S-CSCF response logic 430. While HSS 260 is not available, user devices 120 may register by default with S-CSCF 220 (since authentication information may not be available to authenticate the identity of user devices 120) and S-CSCF 220 may send registration information to S-CSCF address server 240.

S-CSCF address database 410 may include S-CSCF address records 502 (shown in FIG. 5 as rows of table 500) associated with one or more user devices 120. As shown in FIG. 5, each S-CSCF address record 502 may be associated with a single user device 120 and may include a unique identifier 504 associated with user device 120 (e.g., a mobile directory number (MDN), a MSISDN, a uniform resource identifier (URI), an IP address, etc.) (shown in FIG. 5 as 111222444, etc.), an S-CSCF address 506 of S-CSCF 220 that is assigned to serve user device 120 (shown in FIG. 5 as 132.197.76.55, etc.), and a validity period 508 of user device 120 association with S-CSCF 220 (or expiration information of the registration) (shown in FIG. 5 as 12.2.2012.8.15.00, i.e., a particular time at which the registration expires).

S-CSCF address record logic 420 may manage S-CSCF address records 502, including creating and updating S-CSCF address records 502 and providing the S-CSCF address records 502 to I-CSCF 230 that may request the S-CSCF address 506 associated with a particular user device 120 (e.g., based on the unique identifier 504).

S-CSCF address record logic 420 may receive key information, associated with a user device 120, from S-CSCF 220 (e.g., from an S-CSCF 220 that accepts a registration from a user device 120 when HSS 260 is unavailable). The key information may include, for each user device 120, the unique identifier 504 and the S-CSCF address 506 of the S-CSCF 220 that sends the key information, as well as a validity period 508 of SIP registration (for user device 120) with the sending S-CSCF 220. S-CSCF address record logic 420 may query S-CSCF address database 410 to identify whether an S-CSCF address record 502 exists for the user device 120. If an S-CSCF address record 502 exists for the user device 120, S-CSCF address record logic 420 may update the address record 502 including determining whether a new (or the same) S-CSCF 220 is to be associated with user device 120 and a current validity 508 of the SIP registration for user device 120 (i.e., update a registration time for user device 120 with S-CSCF 220). If an S-CSCF address record 502 does not exist for the user device 120, S-CSCF address record logic 420 may create a new S-CSCF address record 502 based on the key information received from S-CSCF 220.

S-CSCF response logic 430 may receive requests for S-CSCF 220 address from I-CSCF 230 (e.g., when I-CSCF 230 requests (or attempts to request) a serving S-CSCF 220 address from HSS 260 and determines that HSS 260 is unavailable). S-CSCF response logic 430 may check to verify that a registration for user device 120 has not yet expired and return the S-CSCF address to I-CSCF 230. When I-CSCF 230 receives an S-CSCF 220 address from S-CSCF address server 240, I-CSCF 230 may route the call to the S-CSCF 220 that user device 120 has registered with. S-CSCF 220 may deliver the call to the appropriate application server (such as TAS 250), if required, before sending the call to P-CSCF 210 serving the called user device 120, based on the earlier registration procedure. If the registration has expired, then S-CSCF response logic 430 may not return the S-CSCF address to the I-CSCF 230 (because the information may be stale).

Figure 6:
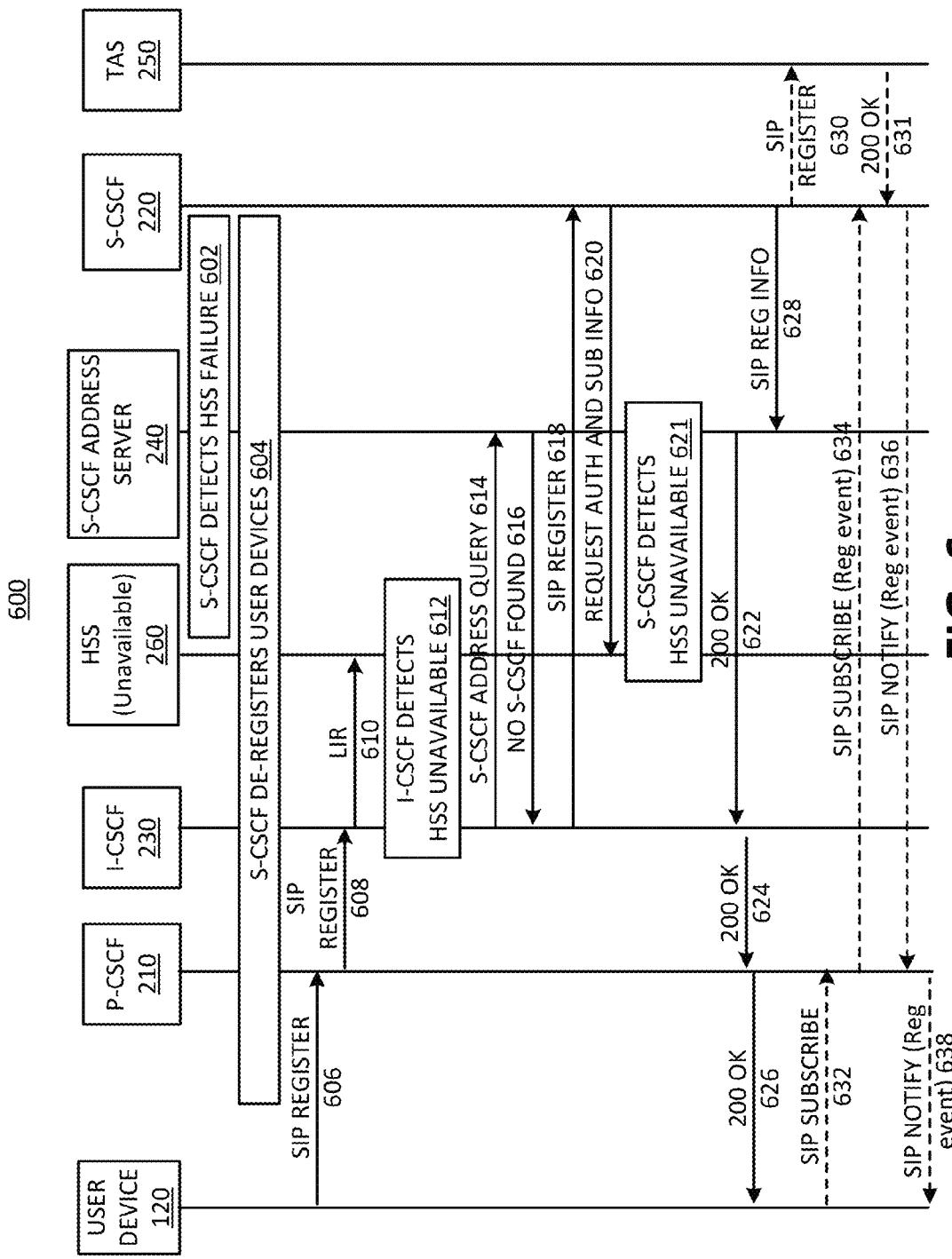
FIG. 6 is a signal diagram of exemplary messages implementing registration in a network in an instance in which home subscriber server (HSS) is unavailable and there is no valid record found in the S-CSCF address server.
Figure 7:
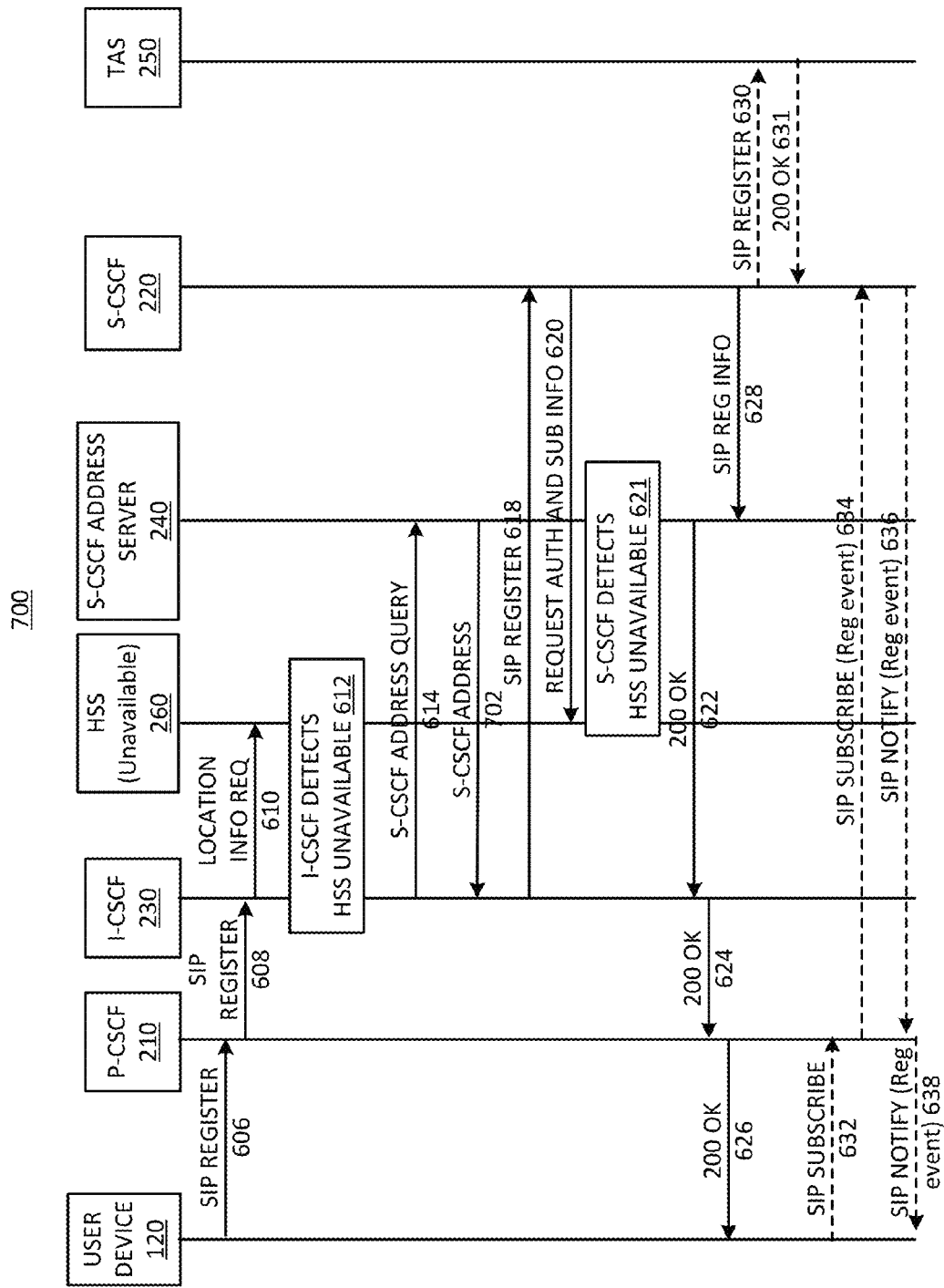
FIG. 7 is a signal diagram of exemplary messages implementing registration for in a network in an instance in which HSS is unavailable and there is a valid record found in the S-CSCF address server.

FIGS. 6 and 7 illustrate signal diagrams 600 and 700, respectively, of exemplary dialogs implementing default registration in network 100 in instances in which a home subscriber server is unavailable. As illustrated, signal diagrams 600 and 700 may include transactions or messaging between user device 120, P-CSCF 210, S-CSCF 220, I-CSCF 230, S-CSCF address server 240, TAS 250, and HSS 260. The transactions illustrated in FIGS. 6 and 7 are for illustrative purposes only. Other transactions may be implemented. Therefore, signal diagrams 600 and 700 may include additional, fewer and/or different components and/or transactions than those depicted in FIGS. 6 and 7. Also, in some instances, one or more of the components of signal diagrams 600 and 700 may perform one or more transactions described as being performed by another one or more of the components of signal diagrams 600 and 700.

FIG. 6 includes a call flow 600 for initial registration or re-registration in an instance in which HSS 260 is not available and there is no valid S-CSCF address record in S-CSCF address server 240 (or associated S-CSCF address database 410). Broken lines indicate optional signal flows.

As shown in FIG. 6, S-CSCF 220 may detect that HSS 260 has become unavailable (process 602) based on predetermined processes and criteria. For example, S-CSCF 220 may attempt to communicate with HSS 260 and may not receive a response within a predetermined time (i.e., the response has "timed out") or HSS 260 may return an error message indicating an inability to provide requested information. When the total number of no responses and/or error messages reaches a pre-determined amount within certain duration, S-CSCF 220 may declare that HSS 260 has become unavailable or failed. In some implementations (as shown in FIG. 6), S-CSCF 220 may de-register all user devices 120 associated with the failed/unavailable HSS 260 by sending a SIP Notify (Registration event with expire=0) indicating that the current registration has expired in the IMS network (process 604). Consequently, user devices 120 associated with that HSS 260 may register again with the IMS network. In other implementations, the S-CSCF 220 may not de-register all user devices 120 associated with a failed HSS 260 but wait for the user devices 120 to re-register based on predetermined registration procedures whenever the current registration expires.

User device 120 may send a SIP register message to P-CSCF 210 (signal flow 606). P-CSCF 210 may select any I-CSCF 230 based on a home domain within the SIP register message. P-CSCF 210 may forward the SIP register message to the selected I-CSCF 230 (signal flow 608). I-CSCF 230 may send a diameter (i.e., an authentication, authorization and accounting protocol) location information request (LIR) message to HSS 260 (signal flow 610) to retrieve the assigned S-CSCF 220 address for user device 120. I-CSCF 230 may detect HSS 260 failure (such as the query to HSS 260 has "timed out" or the I-CSCF 230 has received an error code from HSS 260 indicating that HSS 260 is busy or not available) (process 612). I-CSCF 230 may query S-CSCF address server 240 for a serving S-CSCF 220 assigned to user device 120 using the unique identifier 504 associated with user device 120 (signal flow 614). S-CSCF address server 240 may return a message indicating that there is no valid assignment of S-CSCF 220 associated with user device 120 found (signal flow 616). S-CSCF address server 240 may return this response to I-CSCF when there is no 502 record found for the unique identifier 504 or the existing 502 record has an expired validity 508. In some implementations, I-CSCF 230 may send a diameter LIR message to query the S-CSCF address server 240, and S-CSCF address server 240 may reply with a diameter location information answer (LIA) message to I-CSCF 230. In other implementations, different protocols or methods (e.g., lightweight directory access protocol (LDAP) Read, hypertext transfer protocol (HTTP) Get, etc.) may be used for communication between the I-CSCF 230 and S-CSCF address server 240.

When I-CSCF does not receive an assigned S-CSCF 220 for user device 120 from HSS 260 and S-CSCF Address Server 240, I-CSCF 230 may select an S-CSCF 220, based on local configuration or other methods (such as domain name server (DNS) look up or round robin) and forward the SIP register message to the selected S-CSCF 220 (signal flow 618). In some implementations, S-CSCF 220 may stop querying the HSS 260 until it has determined that HSS 260 has recovered from previous condition and become available again. In other implementations, S-CSCF 220 may continue sending a request (e.g., in a diameter multimedia-auth-request (MAR) message) to HSS 260, asking for authentication and subscriber information (e.g., iFC documents applicable to the user device 120), (signal flow 620). If response to the request has timed out or HSS 260 returns an error message indicating its unavailability, S-CSCF may determine that HSS 260 remains unavailable (process 621). If S-CSCF 220 receives a successful response, S-CSCF 220 may determine that the HSS 260 has recovered. In this instance, S-CSCF 220 may process the SIP register message according to normal procedure (i.e., function of network 140 when HSS 260 is available) instead of performing default registration. As a result, termination services to user device 120 may be based on the individual subscriber profile of user device 120, downloaded from HSS 260, instead of the default service profile. In this example, as shown in FIG. 6, HSS 260 remains unavailable or failed. As a result, S-CSCF 220 may accept the registration from user devices 120 as a default registration (without authentication or using a default authentication process) and send back a registration confirmation (a SIP 200 OK message in response to the SIP Register message) (signal flows 622, 624, 626) to each of the user devices 120 via I-CSCF 230 and P-CSCF 210.

S-CSCF 220 may send key registration information to S-CSCF address server 240 (signal flow 628). Key registration information may include the unique identifier of user device 120, the address of S-CSCF 220 that the user device 120 is registered with, and a validity period of the registration (or expiration information of the registration). For example, the key information may be provided to S-CSCF address server 240 using a diameter SAR (server-assignment-request) signaling message and acknowledged by S-CSCF address server 240 using a diameter SAA (server-assignment-answer) message. In other implementations, S-CSCF 220 may use different protocols and methods (e.g., SIP Register, LDAP Write, HTTP Post, etc.) to send the key registration information to S-CSCF address server 240. The key information may be stored in S-CSCF address database 410. When there is no existing record 502 associated with the unique identifier 504 of user device 120, S-CSCF address record logic 420 in S-CSCF address server 240 may create a new entry of record 502 for user device 120. When there is an existing record 502 associated with user device 120, S-CSCF address record logic 420 may update the contents of S-CSCF Address 506 and/or Validity 506, as needed, in that record 502.

In one implementation, S-CSCF 220 may provide third-party registration information to TAS 250 (signal flow 630) when S-CSCF 220 accepts a registration request from user device 120 and TAS 250 may send back a 200 OK in response (signal flow 631). TAS 250 may provide additional services in network 100. The deployment and use of TAS 250 as well as S-CSCF 220 providing third party registration to TAS 250 are optional (indicated by broken lines for corresponding signal flows) for this embodiment of termination service for user device 120 in an instance in which HSS 260 is not available. In some implementations, TAS 250 may cache a copy of the previously downloaded subscriber profile from HSS 260 for user device 120. In this particular scenario, termination service may be supported based on the individual subscriber profile of user device 120 instead of a default service profile, even though the terminated user device 120 is registered by default and HSS 260 is unavailable.

User device 120 may subscribe to registration event notification service with S-CSCF 220 by sending a SIP subscribe message to S-CSCF 220 via P-CSCF 210 (signal flows 632, 634) so that S-CSCF may send notification to user device 120 whenever there is a change of its registration status in network 140. S-CSCF 220 may send a SIP notify message to user device 120 via P-CSCF 210 as a confirmation of the subscription of the registration event (signal flows 636, 638). Subscription of registration event by user device 120 may be implemented as an optional part of communication session termination when HSS 260 is unavailable, and it allows the S-CSCF to notify the user device 120 that the IMS network has changed the register status (e.g., from registered to deregistered).

FIG. 7 includes a call flow 700 for initial registration or re-registration in an instance in which the HSS 260 is unavailable to provide the information about the assigned S-CSCF 220 and there is a valid S-CSCF address record in S-CSCF address server 240 (or associated S-CSCF address database 410).

Similarly as described with respect to FIG. 6, as shown in FIG. 7, user device 120 may send a SIP register message to P-CSCF 210 and P-CSCF 210 may forward the SIP register message to I-CSCF 230 (signal flows 606, 608). I-CSCF 230 may send a diameter LIR message to HSS 260, requesting location information of an assigned S-CSCF 220 (i.e., S-CSCF address) (signal flow 610), and may determine that HSS 260 is not available (process 612).

I-CSCF 230 may query S-CSCF address server 240 for an assigned S-CSCF 220 for user device 120 using the unique identifier 504 associated with user device 120 (signal flow 614). S-CSCF address server 240 may return the S-CSCF address of the serving S-CSCF 220 from S-CSCF address database 410 (signal flow 702) if validity 508 associated with the user device 120 has not expired). In some implementations, I-CSCF 230 may send a diameter location information request (LIR) message to query the S-CSCF address server 240, and S-CSCF address server 240 may reply with a diameter location information answer (LIA) message to I-CSCF 230. In other implementations, different protocols or methods (e.g., SIP Info, LADP Read, HTTP get, etc.) may be used for communication between the I-CSCF 230 and S-CSCF address server 240.

I-CSCF 230 may forward the SIP register message to the assigned S-CSCF 220 according to information returned from the S-CSCF address server 240 (signal flow 618). The assigned S-CSCF may send a diameter MAR message to HSS 260, requesting the authentication and subscriber information, (signal flows 620) and may determine that HSS 260 is unavailable because an error message is returned by HSS 260 (not shown) or response has timed out (process 621). S-CSCF 220 may provide default registration to user device 120 and send signal flows 622-626 via I-CSCF 230 and P-CSCF 210 toward user device 120.

Signal flow 620 may be optional in some implementations. If S-CSCF is aware that HSS 260 is unavailable (i.e., has performed a process to determine that HSS 260 is unavailable), then S-CSCF 220 may bypass sending signal flow 620 to HSS 260. If S-CSCF sends signal flow 620 to HSS and receives a successful response from HSS 260 because HSS 260 has become available again, S-CSCF 220 may continue normal registration procedure instead of default registration so that user mobile 120 may receive termination services based on its individual subscriber profile instead of the default service profile. In this example, HSS 260 remains unavailable, so that S-CSCF 220 may continue with default registration.

S-CSCF may send the key registration information (signal flow 628) as described above with respect to FIG. 6 and call flow 600. S-CSCF address server 240 may update the S-CSCF address 508 and validity 508 according to the received information as described above in respect to FIG. 6 and call flow 600.

When User device 120 receives SIP 200 OK message indicating the registration request has been accepted (signal flow 626), user device 210 may (optionally) send a SIP subscribe message (signal flows 632 and 634) to S-CSCF 220 via P-CSCF 210. S-CSCF 220 may send a SIP notify message (signal flows 636 and 638) to user device 120 via P-CSCF 210, in the similar manner as described above in respect to FIG. 6 and call flow 600.

If a TAS 250 is deployed in network 140, S-CSCF may send a third party registration to TAS 250 (signal flow 630) to indicate that user mobile 120 is registered. TAS 250 may reply with a SIP 200 OK message (signal flow 631), as described above in respect to FIG. 6 and call flow 600.

While call flow 600 and call flow 700 illustrate implementation examples of communication session termination when HSS 260 is unavailable with a reactive approach to failure/unavailability of HSS 260, other network operators may implement a proactive approach to communication session termination when HSS 260 is unavailable.

In one implementation, when HSS 260 is available and S-CSCF 220 has successfully authenticated user device 120 and accepted the registration (e.g., when components of network 140, including HSS 260 are functioning normally and available), S-CSCF 220 may send a diameter SAR (message indicating that S-CSCF 220 is the assigned server for this user device 120) message to HSS 260 and send a diameter SAR message to S-CSCF address server 240. Alternatively, a different node, such as a diameter router agent, which may be located in the signaling path between S-CSCF 220 and HSS 260, may forward a copy of the SAR signaling message, from S-CSCF 220 to HSS 260, to S-CSCF address server 240. S-CSCF address server 240 may receive the copy of the SAR and create a record 502 for the registered user device 120.

With this proactive approach, S-CSCF 220 may not have to deregister user devices 120 when S-CSCF 220 detects that HSS 260 has become unavailable or failed. The remaining duration of the registration for user device 120 may remain valid until its regularly scheduled expiration. When HSS 260 becomes unavailable before expiration of registration of a terminated user device 120, I-CSCF 230 may be able to retrieve the S-CSCF 220 address from S-CSCF address server 240 and S-CSCF 220 (and/or TAS 250) may be able to provide regular termination services based on the service profile associated with user device 120 that was downloaded from HSS 260 during earlier registration, instead of default service profile to user device 120.

Figure 8:
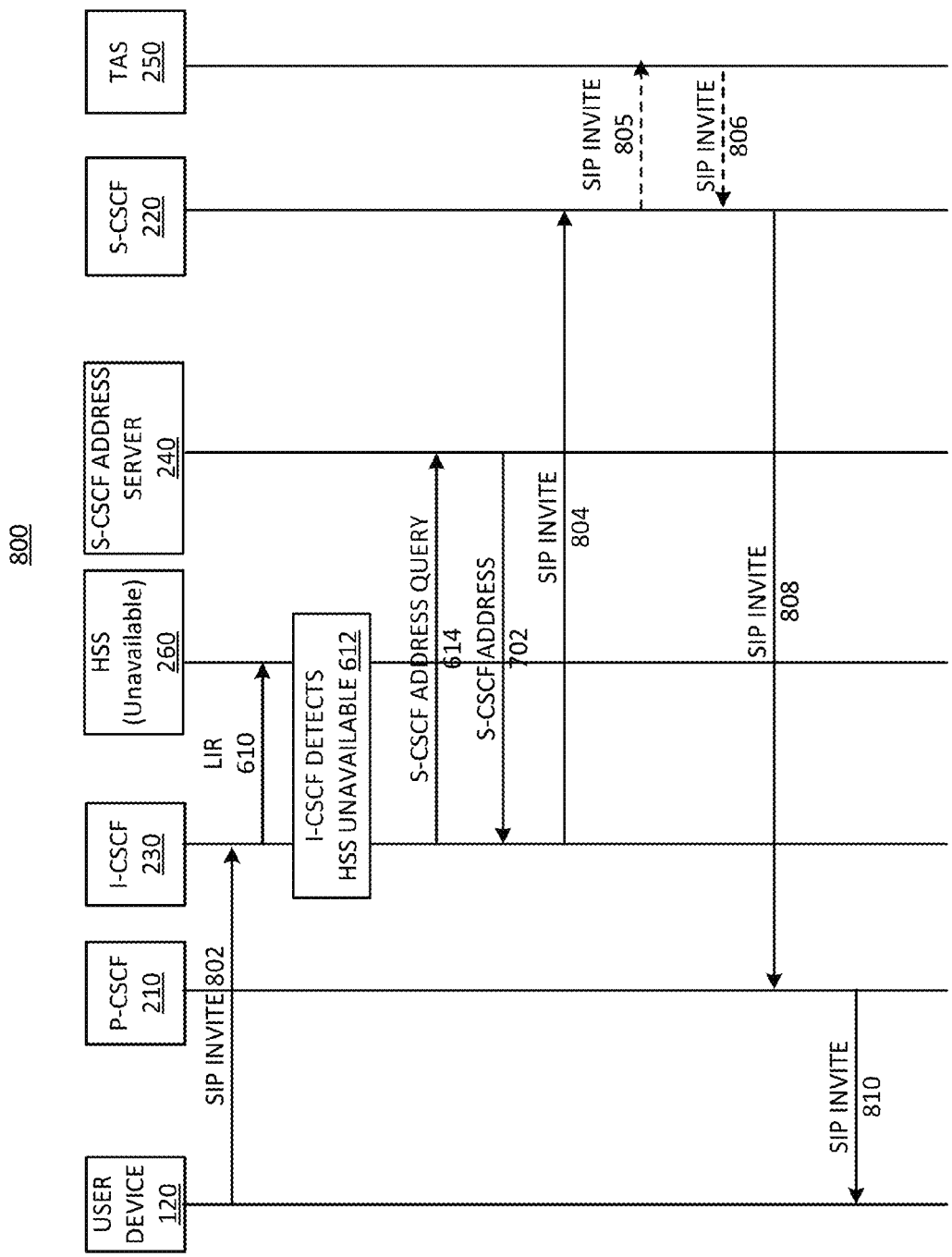
FIG. 8 is a signal diagram of exemplary messages implementing call termination using the S-CSCF address server and a default service profile.

FIG. 8 illustrates a signal diagram 800 of exemplary dialogs implementing call termination to an IMS user (i.e., user device 120) with a default service profile, when user device 120 has default registration with S-CSCF 220 and HSS 260 is unavailable, as described with respect to FIGS. 6 and 7 and signal flow diagrams 600 and 700 above.

As shown in FIG. 8, a SIP invite with a request URI containing the identifier of a user device 120 (e.g., a telephone number associated with user device 120 is called, for example by user device 110) may be received at I-CSCF 230 (signal flow 802). I-CSCF 230 may query HSS 260 for the address of an assigned S-CSCF 220 (signal flow 610), similarly as described above with respect to FIGS. 6 and 7, and may determine that HSS 260 is unavailable (process 612). I-CSCF 230 may then query S-CSCF address server 240 for an assigned S-CSCF 220 (signal flow 614), and may receive the S-CSCF address 506 of the serving S-CSCF 220 (signal flow 702, similarly as described with respect to FIG. 7).

I-CSCF 230 may send a SIP invite message to S-CSCF 220 (signal flow 804). As an implementation option, S-CSCF 220 may send the SIP invite message to TAS 250 (signal flow 805) for terminating service screening and processing, if a separate TAS 250 is deployed in network 140 for call processing. If TAS 250 has a local copy of the subscriber service profile of the terminated user device 120 (e.g., downloaded previously from the HSS 260), TAS 250 may process the call termination based on that subscriber service profile. If TAS 250 does not have a local copy of the subscriber service profile of the terminated user device 120, TAS 250 may attempt to download the subscriber service profile of the terminated user device 120 from the HSS 260 (not shown).

If TAS 250 is successful in downloading the subscriber service profile from HSS 260, TAS 250 may use the downloaded subscriber service profile to process SIP invite message. If TAS 250 is unsuccessful in downloading the subscriber service profile from HSS 260, TAS 250 may use a default service profile, preconfigured by the network operator, to process the SIP invite message. After processing the SIP invite message, TAS 250 may send the call back to S-CSCF 220 from which TAS receives the SIP INVITE message (signal flow 806).

S-CSCF 220 may use the information received in earlier registration by the terminated user device 120 to deliver the incoming communication session request to P-CSCF 210 (signal flow 808). P-CSCF 210 delivers the terminating request to the terminated user device 120 (signal flow 810). In some implementations, TAS 250 may not be deployed by the network operator nor required to process the service request (e.g. SMS message usually does not require the use of a TAS 250). In these instances, S-CSCF may deliver communication session setup request to the terminated user device 120 using a local default service profile that is preconfigured by the network operator, when the subscriber service profile is not available due to the unavailability of the HSS 260 and bypassing signal flows 805 and 806 as shown in FIG. 8.

Figure 9:
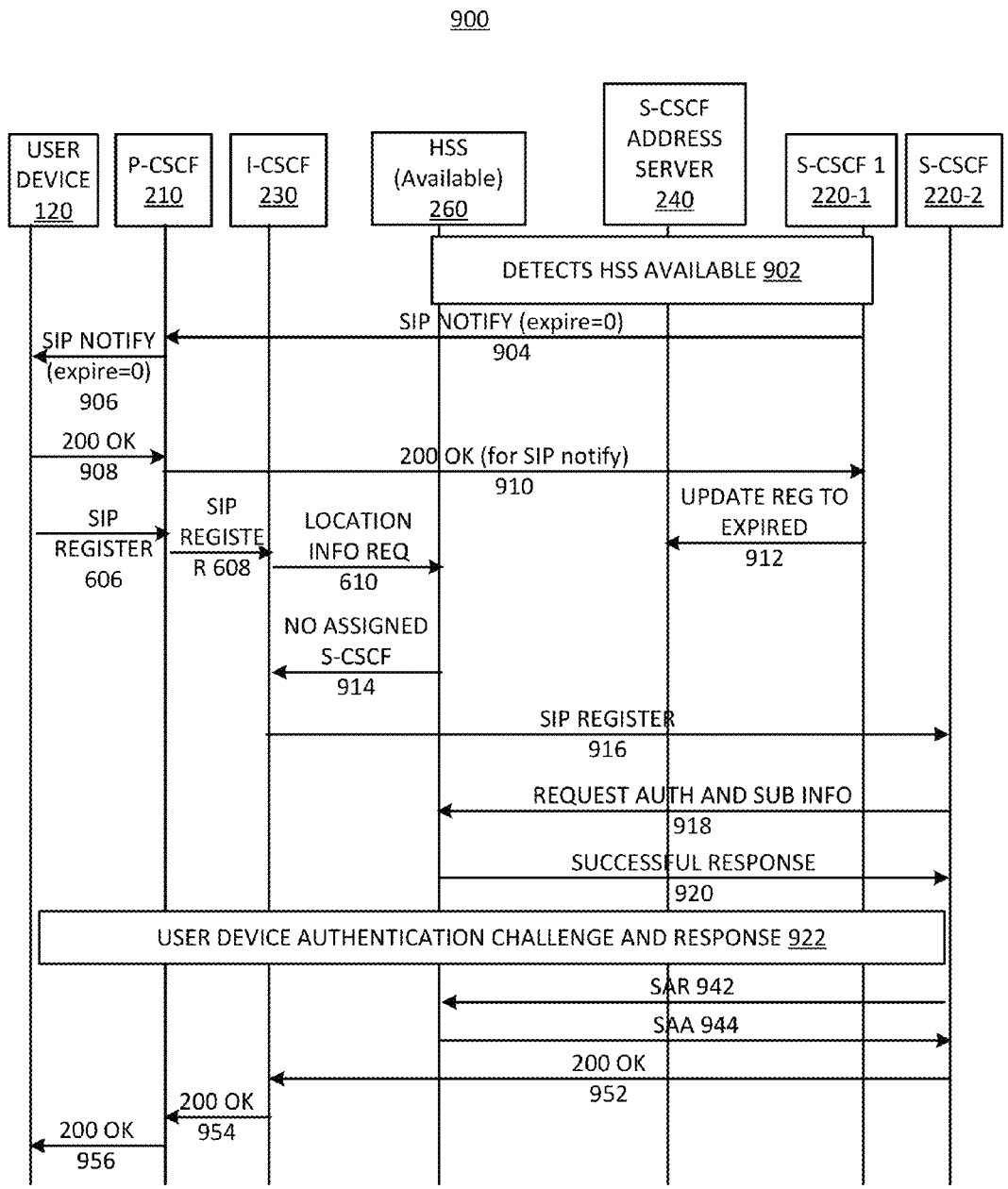
FIG. 9 is a signal diagram of exemplary messages implementing registration with an available HSS after being unavailable.

FIG. 9 illustrates a signal diagram 900 of exemplary dialogs implementing re-registration after HSS 260 has recovered from a failure or become available again so that the subscriber service profile, instead of the default service profile, may be applied for the next communication session setup to user devices 120 that reside in the domain of the (formerly, at that instant) failed/unavailable HSS 260. For example, user device 120 may have been de-registered as described with respect to FIGS. 6 and 7 and signal flow diagrams 600 and 700 above, and termination services may have been provided to user device 120 using a default service profile instead of the individual subscriber profile associated with user device 120. In this instance multiple S-CSCFs 220 (S-CSCF 220-1 and S-CSCF 220-2) are shown to illustrate that re-registration may occur to different S-CSCFs 220.

As shown in FIG. 9, S-CSCF 220-1 may detect that HSS 260 has recovered/is available (signal flow (or process) 902) and send SIP notify message to each IMS user (e.g., user device 120) that is currently default registered with the S-CSCF 220 due to the previous unavailability of HSS 260, indicating that the registration has expired and that user device 120 is to re-register with the IMS network again (signal flows 904, 906).

User device 120 may send a SIP 200 OK message to S-CSCF 220-1 (signal flows 908, 910) in response to the SIP notify message. As an implementation option, S-CSCF 220-1 may send a message to S-CSCF address server 240 that updates registration information for S-CSCF 220-1 to "expired". If S-CSCF 220-1 does not notify S-CSCF address server 240, the validity of the record may expire at a regularly scheduled time.

Similarly as described with respect to FIGS. 6 and 7, user device 120 may send a SIP register message to I-CSCF 230 (signal flows 606, 608). I-CSCF 230 may send a LIR message requesting location information for an assigned S-CSCF 220 to HSS 260 (signal flow 610). HSS 260 may send a LIA message to I-CSCF 230 indicating that there is no assigned S-CSCF 220 (signal flow 914).

I-CSCF 230 may select a new S-CSCF 220, which may be the same S-CSCF 220 (i.e., S-CSCF 220-1) or a different S-CSCF 220, such as S-CSCF 220-2, to user device 120. I-CSCF 230 may send a SIP register message to S-CSCF 220-2 (signal flow 916). S-CSCF 220-2 may request authentication and subscription related information from HSS 260 and may perform registration procedures which may include challenging the user device 120 for authentication credentials (not shown) and downloading subscriber data (such as iFC documents that are applicable to user device 120) from HSS 260 (signal flows 918, 920). S-CSCF 220-2 may perform authentication challenge by sending a SIP 401 unauthorized message to user device 120 which will respond with a new SIP register message with the authentication responses (process 922).

S-CSCF 220-2 may send a diameter SAR message to HSS 260 and HSS 260 may respond with a diameter SAA message (signal flows 942 and 944). S-CSCF may accept the registration request by sending SIP 200 OK message to user device 120 (signal flows 952, 954, and 956). In some other implementations, the network operator may choose not to implement process 900. In these instances, the network may continue providing terminating services with default service profiles until the terminated user devices 120 re-registers in its nature course (e.g., when user device 120 reenters the IMS coverage or when the current registration expires).

Figure 10:
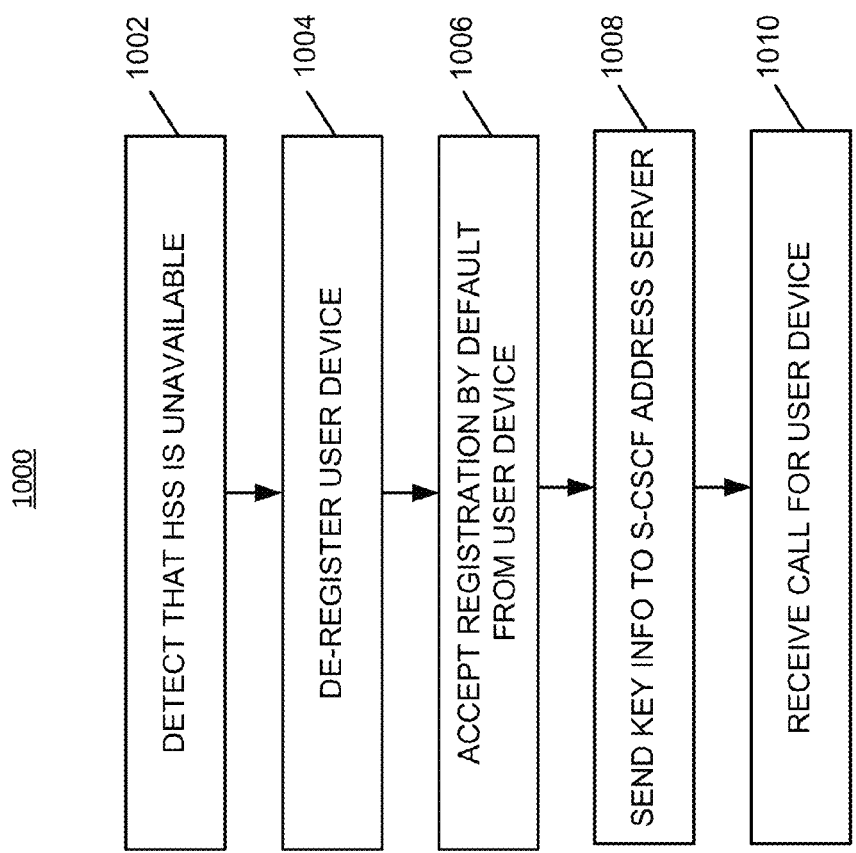
FIG. 10 is a flow diagram illustrating exemplary processing associated with call termination in a network using S-CSCF address server and a default service profile in instances in which a subscriber server is unavailable.

FIG. 10 is a flow diagram illustrating exemplary processing associated with call termination in network 100 using a default service in instances in which a subscriber server is unavailable. In one implementation, process 1000 may be performed by S-CSCF 220. In another implementation, some or all of process 1000 may be performed by another device or group of devices, including or excluding S-CSCF 220.

At block 1002, S-CSCF 220 may determine that HSS 260 is unavailable. For example, S-CSCF 220 may determine that HSS 260 is unavailable when a query to HSS 260 has "timed out" or when S-CSCF 220 receives an error code from HSS 260 indicating HSS server is busy or not available.

At block 1004, S-CSCF 220 may de-register user device 120. For example, S-CSCF 220 may send a SIP notify message indicating that user device 120 has been de-registered by network 140 (i.e., registration controlling components in network 140). User devices 120 that have been de-registered by network 140 may subsequently attempt to re-register by sending a SIP register message to P-CSCF 210.

At block 1006, S-CSCF 220 may accept the registration by default (i.e., without authentication or some type of default authentication) by sending back a registration confirmation (e.g., a SIP 200 OK message) to user device 120.

S-CSCF 220 may send key information of the SIP registration to S-CSCF address server 240 (block 1008). Key information may include the unique identifier (e.g., telephone number) of user device 120, the address of the S-CSCF that user device 120 is registered with, and the validity period of the SIP registration (or expiration information of the SIP registration). S-CSCF address server 240 may process the key information as described below with respect to process 1100 and FIG. 11.

At block 1010, after SIP registration procedures have been completed (blocks 1002 to 1008, signal flows 600 and 700), S-CSCF 220 may receive a call setup request (e.g., a SIP invite message) from I-CSCF 230. I-CSCF 230 may retrieve the assigned S-CSCF address from S-CSCF address server 240. I-CSCF 230 may route the call setup request to S-CSCF 220 with which user device 120 has registered. Additionally, S-CSCF 220 may deliver the call to the appropriate application server (such as the TAS 250) if required before sending the call to P-CSCF 210 serving the called IMS user, based on an earlier registration procedure.

Figure 11:
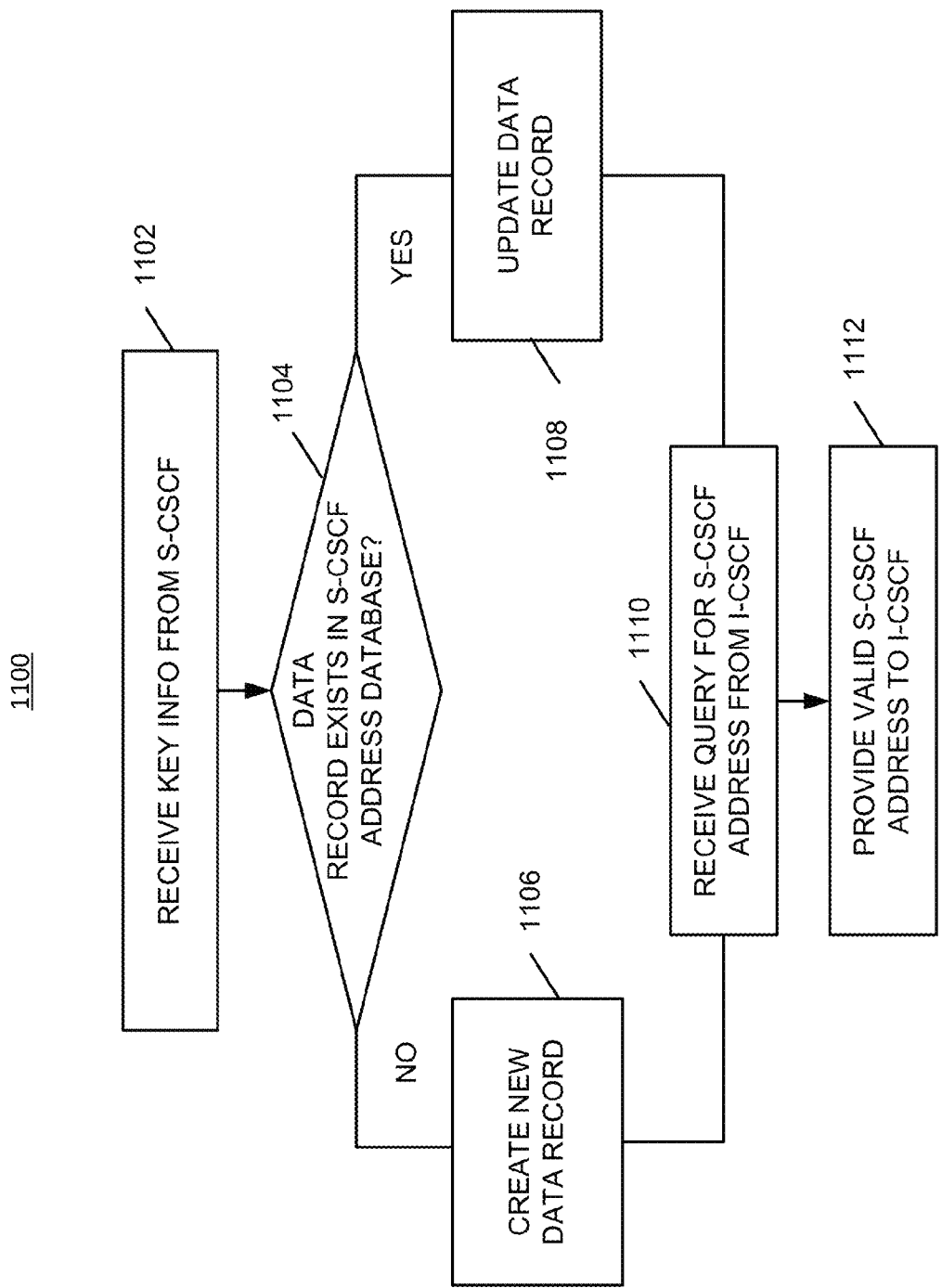
FIG. 11 is a flow diagram illustrating exemplary processing implementing registration with an available HSS after being unavailable.

FIG. 11 is a flow diagram illustrating exemplary processing associated with call termination in network 100 using a default service in instances in which a subscriber server is unavailable. In one implementation, process 1100 may be performed by S-CSCF address server 240. In another implementation, some or all of process 1100 may be performed by another device or group of devices, including or excluding S-CSCF address server 240.

S-CSCF address server 240 may receive key information, including a unique identifier associated with a user device 120, from an S-CSCF 220 (block 1102). At block 1104, S-CSCF address server 240 may determine whether there is an existing record for the received unique identifier.

At block 1106, S-CSCF address server 240 may create a data record with the S-CSCF address and expiration of registration which may be searched by unique identifier (e.g., telephone number) of the user device 120 (i.e., the data record may be located using the unique identifier), when an existing data record is not found in S-CSCF address server 240.

At block 1108, S-CSCF address server 240 may, if there is already an existing data record, such as instances of a re-registration, update the existing data record. For example, S-CSCF address server 240 may update the expiration time and/or the S-CSCF address for the unique identifier.

At block 1110, S-CSCF address server 240 may receive a query from I-CSCF 230. For example, when there is a communication session setup request (e.g., SIP invite message) to user device 120 (e.g., a SIP invite message) arrives to any I-CSCF 230 in the IMS network, I-CSCF 230 may query the called IMS user's HSS 260 for the S-CSCF address. If HSS 260 is not accessible, the query may be timed out or S-CSCF may receive an error message from HSS 260. I-CSCF 230 may then query S-CSCF address server 240 using the unique identifier associated with the terminated user device 120 (e.g., telephone number included in the request URI in the SIP invite message).

S-CSCF address server 240 may provide a valid S-CSCF address to I-CSCF 230 (block 1112). For example, S-CSCF address server 240 may first check to verify that the default registration has not expired. If the default registration has not expired, S-CSCF address server 240 may provide the S-CSCF address to I-CSCF 230. I-CSCF 230 may route the received communication session setup request to the S-CSCF 220 that the user has registered with (e.g. see block 1010 of process 1000 described with respect to FIG. 10 above). S-CSCF 220 may deliver the termination service using a default service profile and registration information to the terminated user device 120.

Systems and methods described herein may provide communication session termination in a network by querying a new network server for the serving node location and using a default service profile in instances in which a subscriber server that includes subscriber profiles for a called party is unavailable. This may allow a minimum level of call termination service to be provided in association with a default service profile when the subscriber server is not available.

Although particular types of networks and network components are described, systems and methods may be applied to other networks and network components that require a user to register. For example, in a home network, such as a code division multiple access (CDMA) network or global system for mobile communications (GSM) network, a serving mobile switching center (MSC) may be analogous to S-CSCF 220, a first home location register (HLR) may be analogous to HSS 260, and a temporary HLR may be analogous to S-CSCF address server 240.

If the first HLR fails, the serving MSC may de-register all the mobile devices associated with the failed HLR. When a mobile device registers again, the serving MSC may send the registration message to the first HLR. A signaling system no. 7 (SS7) network at the home network may re-route the registration message to the temporary HLR in the home network based on the unavailability of the first HLR. The temporary HLR may return a default service profile to the serving MSC (to complete successful registration). When an incoming call arrives at a home MSC (analogous to P-CSCF 210) for the mobile device, the home MSC may query the first HLR for the mobile location and the SS7 network may re-route the request to the temporary HLR because the first HLR is unavailable (or the home MSC may query the temporary HLR after unsuccessfully querying the first HLR). The temporary HLR may then obtain a temporary routing number for the home MSC to forward the incoming call to the serving MSC for the mobile device.

Systems and methods described herein may be applied in access technologies such as LTE, Enhanced High Rate Packet Data (eHRPD), Wi-Fi, universal terrestrial radio access network (UTRAN), evolved UMTS (i.e., Universal Mobile Telecommunications System) Terrestrial Radio Access Network (EUTRAN), wireline access, fiber optic telecommunications, Internet/web access, etc. The system may be applied to a voice over Internet protocol (VoIP) service including at least auser device 120 that is registered (i.e., normally or by default) as a call termination point.

The foregoing description provides illustration and description, but is not intended to be exhaustive or to limit the embodiments to the precise form disclosed. Modifications and variations are possible in light of the above teachings or may be acquired from practice of the invention. For example, while series of signal flows have been described with respect to FIGS. 6, 7, 8 and 9 and series of acts have been described with regard to the flowcharts of FIGS. 10 and 11, the order of the signals flows and acts may differ in other implementations. Further, non-dependent signal flows and acts may be performed in parallel.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   receiving, at a serving call session control function (S-CSCF) address server, key information indicating that a S-CSCF is an assigned server for a user device, wherein the S-CSCF address server is to provide communication session termination for the user device in an event that a home subscriber server (HSS) is unavailable, and the key information includes a unique identifier associated with the user device, and an S-CSCF address of the S-CSCF;
   determining whether a data record based on the key information exists in the S-CSCF address server, wherein the data record includes the unique identifier associated with the user device, the S-CSCF address of the S-CSCF, and a validity period of registration of the user device;
   updating the data record based on the key information in response to a determination that the data record based on the key information exists in the S-CSCF address server;
   creating a new data record based on the key information in response to a determination that the data record based on the key information does not exist in the S-CSCF address server; and
   wherein each data record in the S-CSCF address server is searchable based on each unique identifier of the user device to provide an S-CSCF address of a serving S-CSCF associated with a corresponding user device.

2. The computer-implemented method of claim 1, wherein updating the data record based on the key information further comprises:
   updating at least one of the validity period of registration and the S-CSCF address of the S-CSCF.

3. The computer-implemented method of claim 1, further comprising:
   receiving, from an interrogating call session control function (I-CSCF), a request for an S-CSCF address of an S-CSCF associated with a unique identifier;
   identifying a validity period of the registration for the user device with the S-CSCF;
   determining whether the registration is currently valid based on the validity period of the registration for the user device with the S-CSCF; and
   providing the S-CSCF address to the I-CSCF in response to a determination that the registration is currently valid.

4. The computer-implemented method of claim 3, wherein the I-CSCF is operable to provide call termination to at least one of the user device and an application server associated with the user device.

5. The computer-implemented method of claim 1, wherein the S-CSCF is operable to provide call termination for the communication session termination based on a default service profile, wherein the default service profile includes information indicating services that the user device is allowed to receive.

6. The computer-implemented method of claim 1, wherein the key information includes a validity period of registration for the user device with the S-CSCF, and wherein the S-CSCF accepts the registration for the user device, without valid authentication, in response to a determination that the HSS is unavailable.

7. The computer-implemented method of claim 1, wherein the S-CSCF authenticates the user device based on information received from the HSS when the HSS is available, and the S-CSCF address server is assigned to the user device prior to the HSS becoming unavailable.

8. A computer-implemented method comprising:
   detecting, at a serving call session control function (S-CSCF), that a home subscriber server (HSS) is unavailable, wherein detecting that the HSS is unavailable comprises at least one of receiving a notification from the HSS or timing out of a request sent to the HSS;
   de-registering at least one user device associated with the S-CSCF;
   registering the at least one user device by default in response to detecting that the HSS is unavailable, wherein the registration by default includes key information;
   sending the key information to an S-CSCF address server; and
   receiving at least one telephone call from an interrogating call session control function (I-CSCF), wherein the I-CSCF directs the telephone call to the S-CSCF based on the key information sent to the S-CSCF address server.

9. The computer-implemented method of claim 8, further comprising:
   providing call termination for the telephone call based on a default service profile, wherein the default service profile includes information indicating services that the at least one user device is allowed to receive.

10. The computer-implemented method of claim 8, wherein de-registering the at least one user device associated with the S-CSCF comprises:
    sending a session initiation protocol (SIP) notify to the user device indicating that the at least one user device has been de-registered.

11. The computer-implemented method of claim 8, wherein accepting the registration by default further comprises:
 accepting the registration based on a default authentication process; and
 sending a registration confirmation message to the at least one user device.

12. The computer-implemented method of claim 8, further comprising:
 detecting that the HSS has become available; and
 de-registering the at least one user device associated with the S-CSCF, wherein the at least one user device is to re-register with the HSS.

13. A computer-implemented method comprising:
 detecting, at an interrogating call session control function (I-CSCF), that a home subscriber server (HSS) is unavailable, wherein detecting that the HSS is unavailable comprises at least one of receiving a notification from the HSS or timing out of a request sent to the HSS;
 receiving, in association with a user device, a session initiation protocol (SIP) register message;
 querying a S-CSCF address server;
 receiving an indication that there is no valid S-CSCF address associated with the user device;
 selecting a S-CSCF based on a local configuration of the I-CSCF; and
 forwarding the SIP register message to the selected S-CSCF, wherein the selected S-CSCF is to accept registration by default of the user device and to forward key information of the user device to a S-CSCF address server.

14. A system comprising:
 a first call session control component to:
  detect that a subscriber server is unavailable,
  de-register a user device associated with the first call session control component,
  accept registration by default from the at least one user device, wherein the registration by default includes key information, including a unique identifier associated with the user device, an address of the first call session control component, and a validity period of registration for the user device with the first call session control component, and
  send the key information to a first call session control component address server; and
 the first call session control component address server to:
  determine whether a data record based on the key information exists in the first call session control component address server,
  update the data record based on the key information in response to a determination that the data record based on the key information exists in the first call session control component address server,
  create a new data record based on the key information in response to a determination that the data record based on the key information does not exist in the first call session control component address server,
  receive a query from a second call session control component based on a queried unique identifier,
  determine whether a valid data record associated with the user device exists in the first call session control component address server based on the queried unique identifier, and
  provide a first call session control component address from the valid data record to the second call session control component if the valid data record associated with the user device exists.

15. The system of claim 14, wherein the system is applied to a voice over Internet protocol service including at least one of a wireline user device or a wireless user device.

16. The system of claim 14, wherein system includes one or more of a long term evolution (LTE) network, an Enhanced High Rate Packet Data (eHRPD) network, Wi-Fi, universal terrestrial radio access network (UTRAN), an evolved UMTS (Universal Mobile Telecommunications System) Terrestrial Radio Access Network (EUTRAN), a wireline access network, a fiber optic telecommunications network, or an Internet access network.

17. The system of claim 14, wherein the subscriber server includes a home subscriber server (HSS), the first call session control component includes a serving call session control function (S-CSCF), and the second call session control component includes an interrogating call session control function (I-CSCF).

18. The system of claim 14, wherein the subscriber server includes a home location register (HLR), the first call session control component includes a serving mobile switching center (MSC), and a home mobile switching center (MSC).

19. A device comprising:
 a memory to store a plurality of instructions; and
 a processor configured to execute instructions in the memory to:
  receive key information associated with a user device from an S-CSCF, wherein the key information includes a unique identifier associated with the user device, a P-CSCF address of a proxy call session control function (P-CSCF) via which the user device communicates with the S-CSCF, and a validity period of session initiation protocol (SIP) registration for the user device with the S-CSCF, wherein the S-CSCF accepts the SIP registration for the user device in response to a determination that a home subscriber server (HSS) is unavailable;
  determine whether a data record based on the key information exists in an S-CSCF address database, wherein the data record includes the unique identifier associated with the user device, an S-CSCF address of the S-CSCF, and a validity period of registration;
  update the data record based on the key information in response to a determination that the data record based on the key information exists in the S-CSCF address database;
  create a new data record based on the key information in response to a determination that the data record based on the key information does not exist in the S-CSCF address database; and
  wherein each data record in the S-CSCF address database is searchable based on each unique identifier to provide an S-CSCF address of a serving S-CSCF associated with a corresponding user device.

20. The computer-implemented method of claim 13, further comprising:
 detecting that the HSS has become available; and
 de-registering the user device associated with the S-CSCF, wherein the user device is to re-register with the HSS.

* * * * *